June 13, 1961  R. M. SHERMAN  2,988,287
BOOM SPRINKLER WITH WIND RESPONSIVE MEANS
Filed March 30, 1959  6 Sheets-Sheet 1
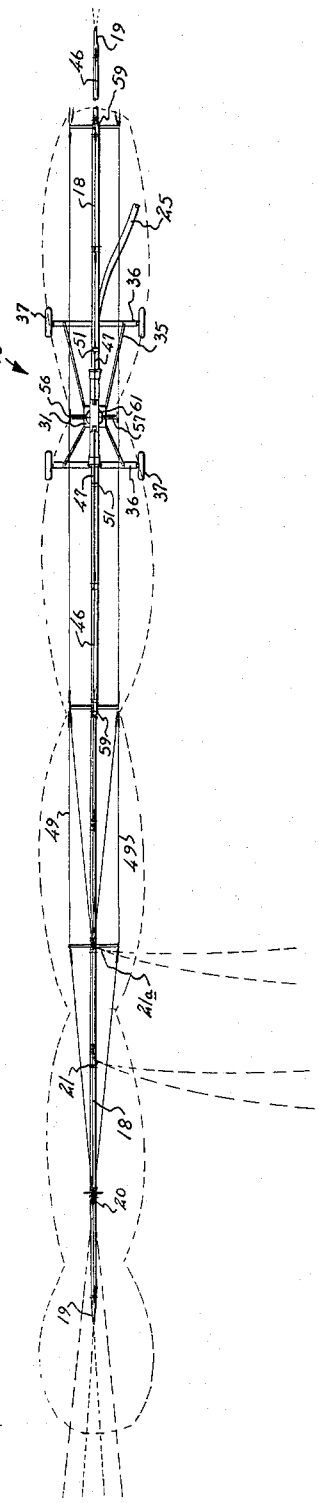
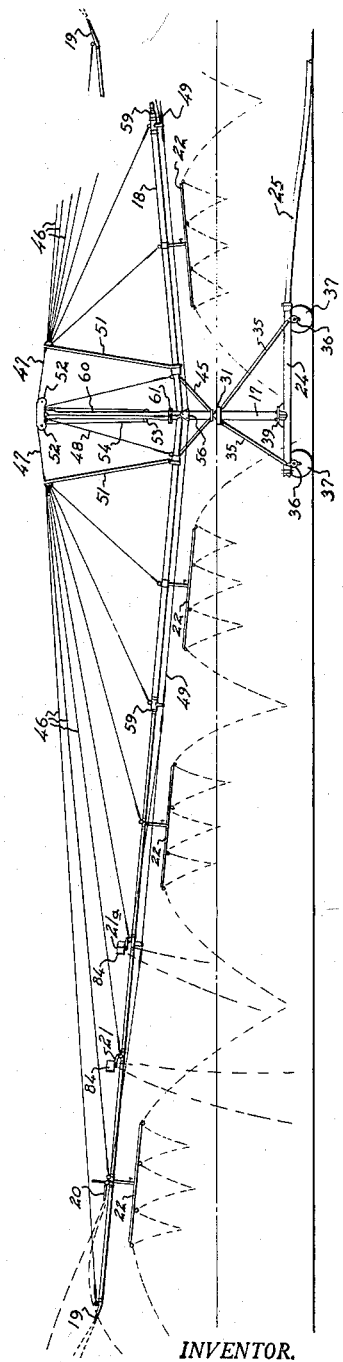
INVENTOR.
ROGER M. SHERMAN
BY
ATTORNEY June 13, 1961  R. M. SHERMAN  2,988,287
BOOM SPRINKLER WITH WIND RESPONSIVE MEANS
Filed March 30, 1959  6 Sheets-Sheet 2

INVENTOR.
ROGER M. SHERMAN
BY
ATTORNEY

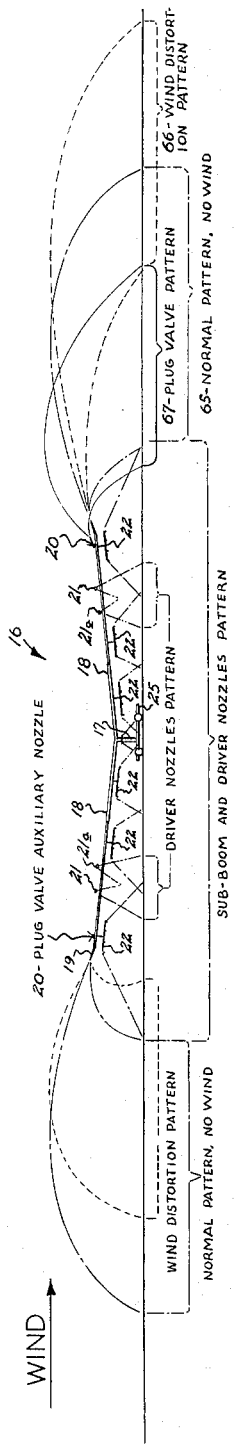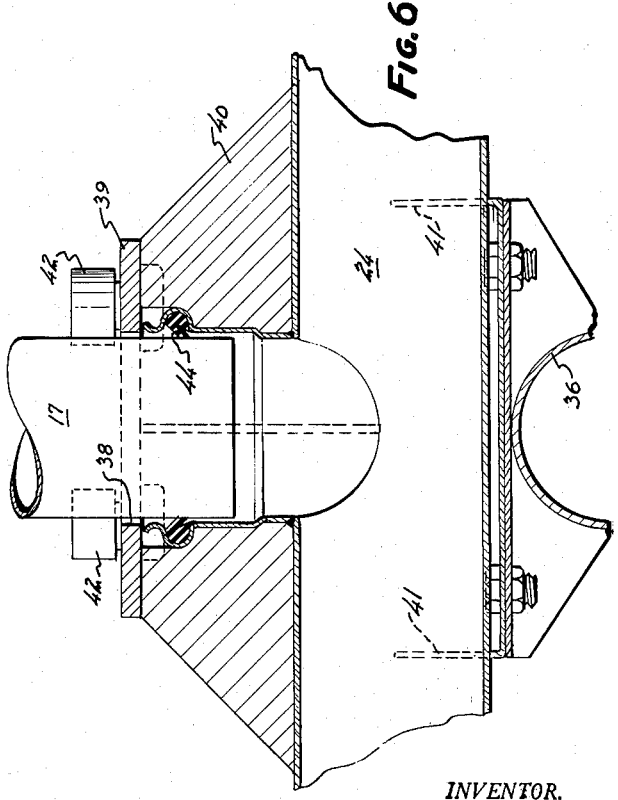

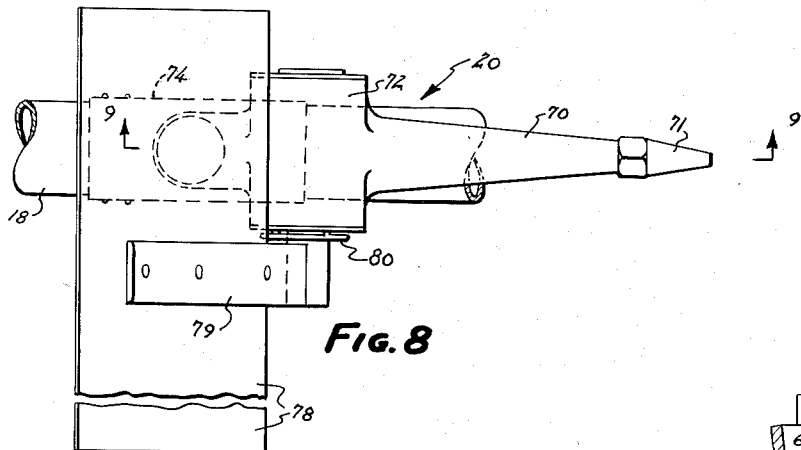
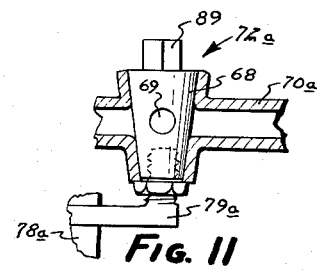
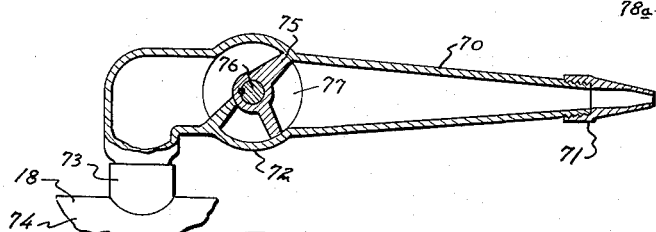
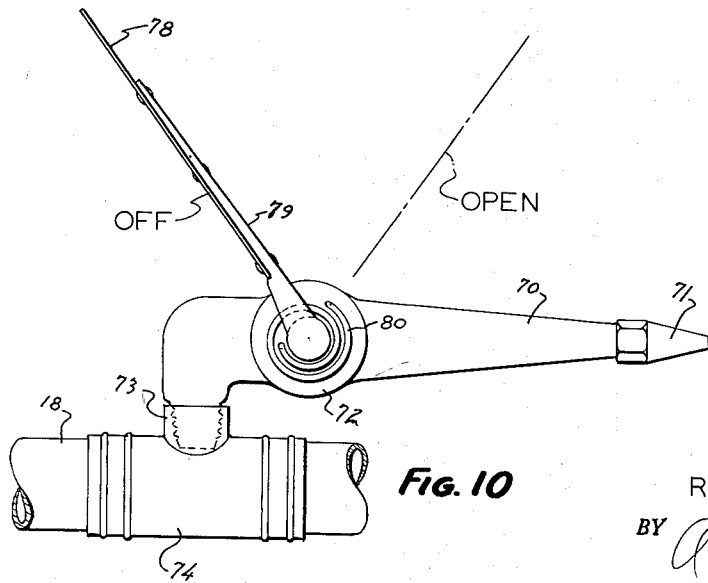

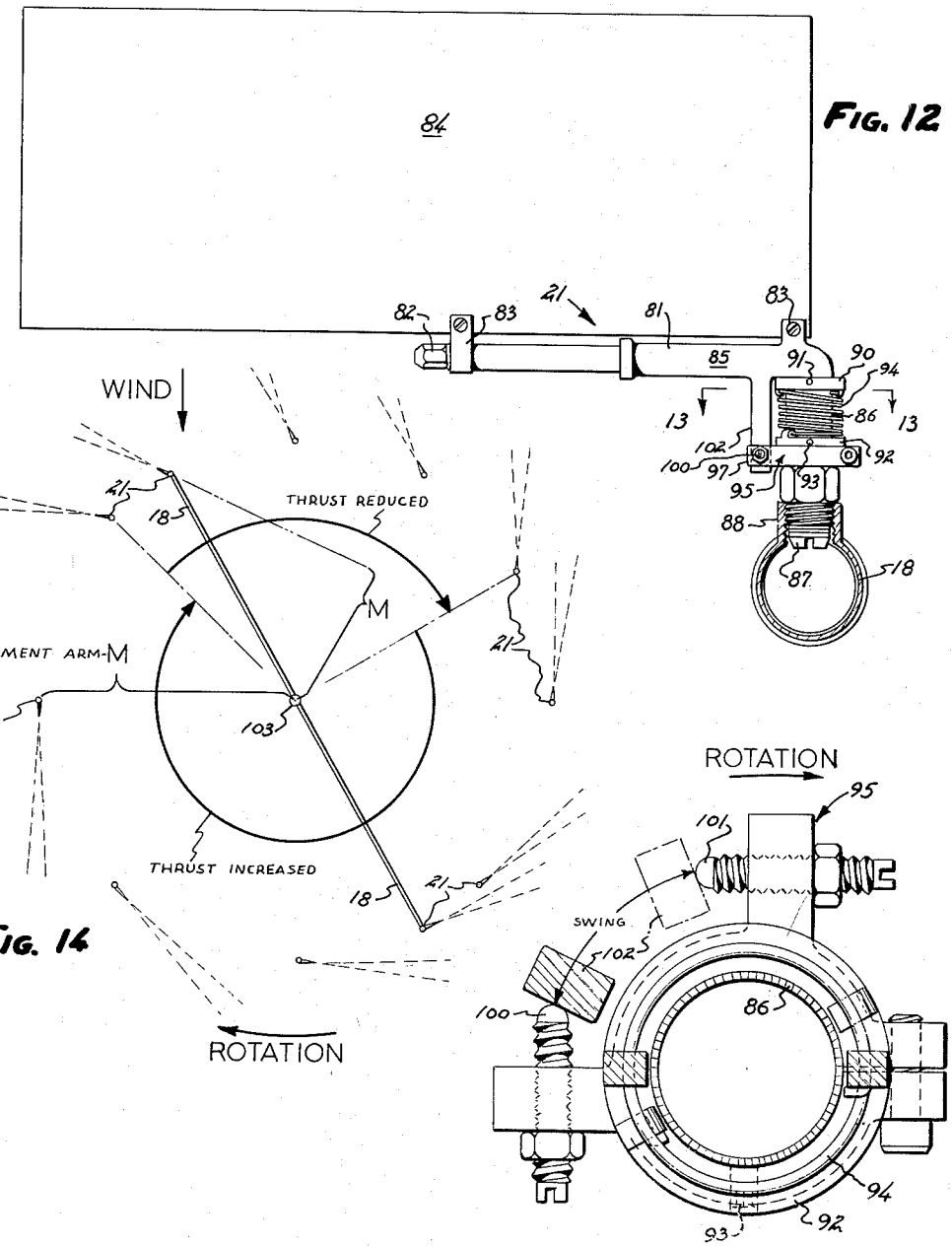

United States Patent Office 2,988,287
Patented June 13, 1961

2,988,287
BOOM SPRINKLER WITH WIND RESPONSIVE MEANS
Roger M. Sherman, Palo Alto, Calif., assignor to W. R. Ames Company, Milpitas, Calif., a corporation of California
Filed Mar. 30, 1959, Ser. No. 802,926
15 Claims. (Cl. 239—243)

This invention relates to sprinkler systems for irrigation purposes and, more particularly, it relates to improvements in rotating boom-type sprinklers, to achieve uniform moisture coverage on the ground under adverse wind conditions.

Rotating boom-type sprinklers driven by jet nozzles have long been employed in many forms, from small, simple lawn sprinklers to large ranch irrigators. The latter have proved particularly advantageous where a relatively large area requires precipitation and where a fixed conduit system is undesirable.

However, a serious problem which has long hampered the extensive use of boom-type sprinklers has been the difficulty of obtaining consistent patterns of moisture distribution over wide areas, especially under windy conditions. In many farms which would normally be watered by boom-type sprinklers, prevailing winds have disrupted the moisture pattern both by causing irregular angular velocity of the boom and by blowing the spray; so some areas have received a relatively heavy precipitation of water while others remained relatively dry. The effect on the crops is obvious.

It is therefore an object of this invention to provide a boom-type sprinkler system which distributes a uniform precipitation pattern of water spray over a predetermined area while operating under prevailing wind conditions.

Another object of the invention is to provide a boom-type sprinkler having a spray pattern that uniformly covers and irrigates a large area of land outwardly from the axis of boom rotation and beyond the ends of the boom.

Another object of the invention is to provide a rotating boom-type sprinkler system which maintains a nearly constant angular velocity under all wind conditions.

Another object of the invention is to provide a rotating boom-type sprinkler having means for varying the spray pattern under various wind conditions, including distribution outlets which turn on and off during portions of a boom-revolution in windy conditions.

Still another object of the invention is to provide a rotating boom-type sprinkler having auxiliary spray means in addition to the main water outlets, which are automatically actuated in response to varying wind conditions.

Still another object of the invention is to provide a rotating boom-type sprinkler with an auxiliary outlet having a valve which varies flow in response to variable wind conditions to provide a consistent precipitation pattern around the boom axis.

More specifically, an object of the invention is to provide a complete boom sprinkler system having a plurality of outlet means extending from a boom to distribute water over the close-in area between the end of the booms and the axis of rotation and means on the boom to automatically maintain constant rotation of the boom and to obtain uniform spray coverage of the area beyond the ends of the boom under variable wind conditions.

Other objects and advantages of the invention will appear from the following description of a preferred embodiment, but it is to be understood that the invention is capable of and susceptible to modification and change, and comprehends other details and constructions without departing from the spirit of the invention or its scope.

In the drawings:
FIG. 1 is a fragmentary view in side elevation of a boom sprinkler incorporating the features of the invention, one-half the sprinkler being shown fully while most of the other half has been broken off.

FIG. 2 is a top plan view of the boom sprinkler as shown in FIG. 1, and similarly broken off.

FIG. 6 is a fragmentary view in vertical section of the lower portion of the mast, on the scale of FIGS. 4 and 5, and taken along the line 6—6 in FIG. 3, showing the coupling between the rotating mast and the stationary chassis coupler-tube.

FIG. 8 is a top plan view of the auxiliary nozzle and its plug valve as used in the boom sprinkler of FIG. 1.

FIG. 9 is a view in elevation and in section of the auxiliary nozzle and plug valve, taken along line 9—9 in FIG. 8.

FIG. 10 is a view in side elevation of the auxiliary nozzle of FIGS. 8 and 9, showing the control vane which actuates the plug valve. The off-position of the vane is shown in solid lines, and its open-position is indicated by a dot-dash line.

FIG. 11 is a fragmentary view in section of a modified form of plug valve.

FIG. 12 is an enlarged view in elevation of a swivel driving-nozzle and its attached vane, mounted on the boom shown in FIG. 1.

FIG. 13 is a view in section of the swivel driving-nozzle taken along line 13—13 in FIG. 12 and showing the limit stop-bracket.

FIG. 14 is a top plan view schematically illustrating how the driving-nozzles shown in FIG. 12 swivel on the boom during its rotation, to provide nearly constant angular velocity thereof in a prevailing wind.

FIG. 15 is a schematic view in elevation, showing the water distribution pattern of the boom sprinkler of FIG. 1 while operating in a prevailing wind.

Figure 3:
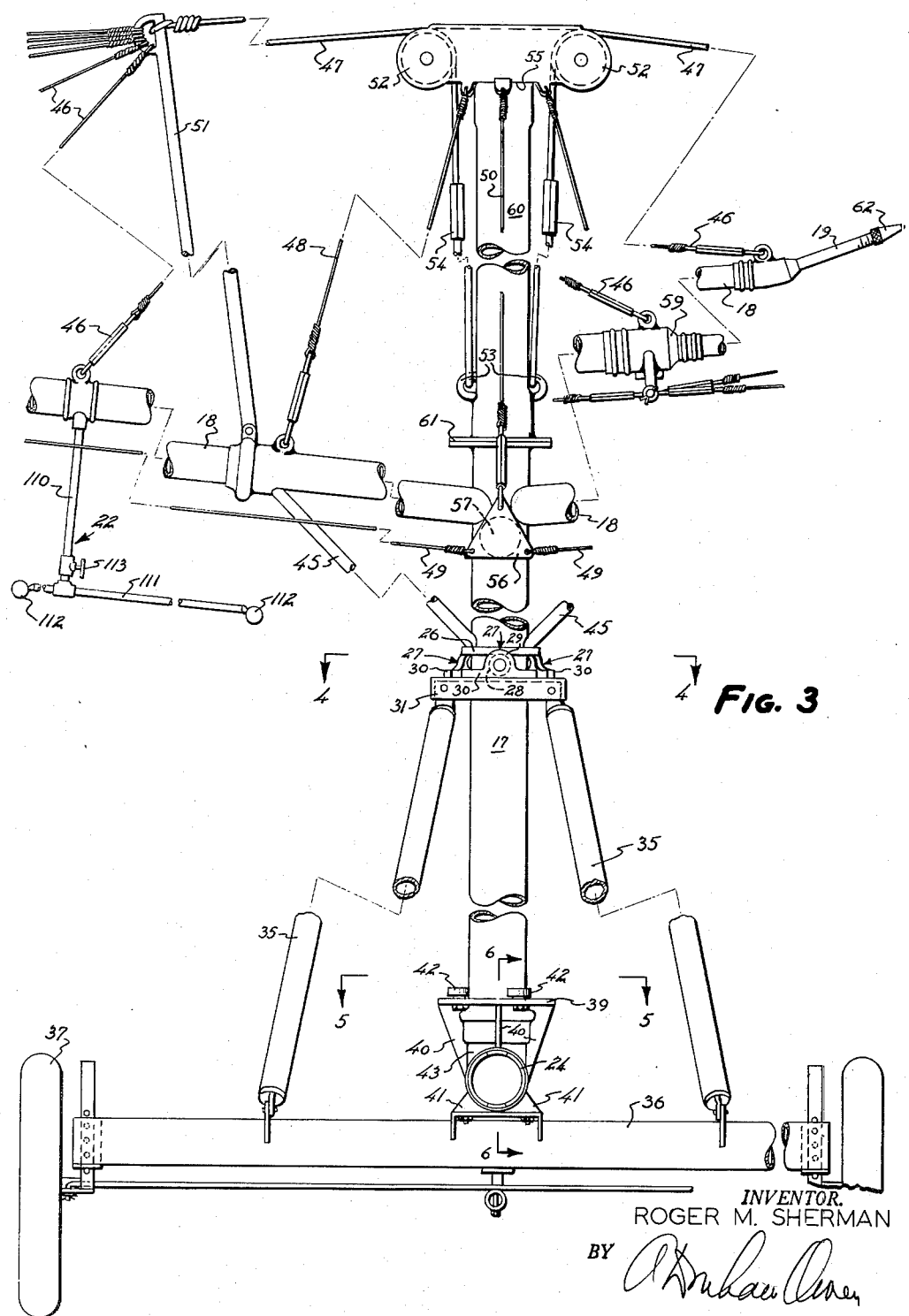
FIG. 3 is an enlarged, fragmentized view in elevation of the mast and some associated parts of the boom sprinkler shown in FIG. 1. The mast, frame members, boom and supporting cables have been broken in order to conserve space.

Basically, this invention provides a rotating-boom sprinkler system 16, comprising a mast 17 supporting boom-arms 18 that are provided with a unique system of outlets which serve to uniformly distribute water over a large area under all wind conditions. The outlets on the boom-arms 18, in addition to the conventional fixed-distribution nozzles 19 generally mounted on the ends of the boom-arms 18, comprise (1) auxiliary jet-nozzles 20 which are automatically actuated by a wind to supply water to an area that is normally watered by the main fixed-nozzles 19 when there is no wind but is left unwatered when a wind is blowing; (2) pivotal driving-nozzles 21 which automatically swivel in a predetermined manner under wind conditions, to vary the driving torque of the boom-arms 18, giving it substantially constant angular velocity; and (3) sub-booms 22 which provide precipitation under the rotating main boom-arms 18. These devices are all connected to the main boom-arms 18 and cooperate in a unique manner to produce the uniform result of a reliable boom-sprinkler irrigation system providing uniform coverage of water over an area, under highly adverse wind conditions.

*The framework and support of the mast 17 and boom-arms 18*

Considering the boom-type sprinkler system 16 in more detail, it will be seen in FIGS. 1 and 2 that the mast 17 is supported by a frame 23 and provides a conduit to feed the attached identical boom-arms 18. The mast 17 and the boom-arms 18 it carries rotate relatively to a fixed-chassis coupler-tube 24, which is attached to the lower portion of the frame 23 and is coupled to a water-supply conduit 25 at one or both ends.

Figure 4:
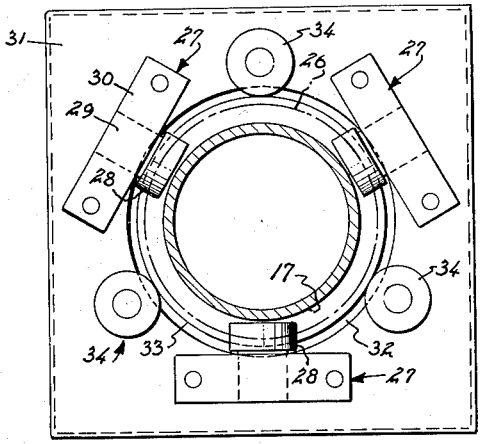
FIG. 4 is a further enlarged view in horizontal section of the mast, taken along the line 4—4 in FIG. 3, showing the thrust-bearing plate.

The supporting structure of the sprinkler system 16 as shown in FIG. 3 is typical, but is not intended to limit the present invention. The mast 17 comprises essentially a vertically mounted section of pipe conduit with a support flange 26 that rests on thrust-bearings 27. The thrust-bearings 27 (see FIGS. 3 and 4) comprise rollers 28 mounted on shafts 29 retained in pillow-blocks 30. The pillow-blocks 30 are mounted on a bearing-plate 31 having a circular opening 32 through which the mast 17 extends. The flange 32 rides on the rollers 27. In addition, a second mast-flange 33, below the rollers 28, may be engaged by side-rollers 34 mounted on the bearing-plate 30 for low-friction rotation and additional alignment. The bearing-plate 31 is attached in any well-known manner to supporting-legs 35 that, in turn, are attached to a lower frame 36 which may be made from steel tubing. Wheels 37 may be mounted on the lower frame 36 to provide mobility to the sprinkler system 16.

Figure 5:
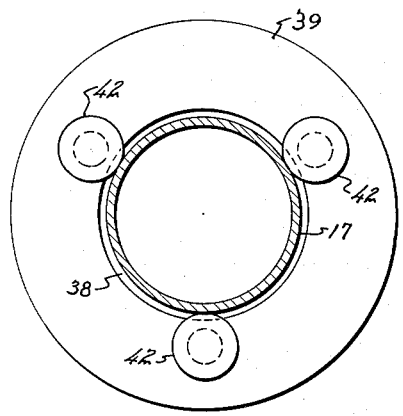
FIG. 5 is a view in horizontal section on the scale of FIG. 4, of the mast taken along the line 5—5 in FIG. 3 and showing the lower alignment plate.

The lower end of the rotatable mast 17 passes through a circular opening 38 in a lower alignment-plate 39 (see FIG. 5). The plate 39 is mounted on brackets 40 that extend up from the coupler-tube 24, the tube 24 being fixed by brackets 41 to the lower frame 36. On the lower alignment-plate 39 are mounted rollers 42 which engage the mast 17 and act as side-bearings to reduce the rotating friction and align the mast 17.

As shown in FIG. 6, the lower end of the mast 17 is tapered to fit rotatably within a neck 43 of the chassis coupler-tube 24, just below the lower alignment-plate 39. Sealing means 44, such as a standard O-ring or Chevron-gasket is provided between the inner surface of the neck 43 and the mast 17 to prevent leakage.

Above the thrust-bearing flange 26 the main boom-arms 18 extend out from the mast 17 and support the various water-distribution outlets. The boom-arms 18, which normally are two in number (although any convenient number may be used), are supported by frame members 45 extending upward from the flange 26 and by a system of guy-wires 45 and cables 47, 48, 49, and 50. The guy-wires 46 extend from various points of each boom-arm 18 to a jib-mast 51 on each boom-arm 18. A cable 47 attached to each jib-mast 51 passes over a sheave 52 at the top of the mast 17, extends down along the mast 17, and is attached to rings 53 welded to the mast 17. Turnbuckles 54 or any equivalent means may be provided to take up slack in the cables 47. The cables 48 attached to the boom-arms 18 inwardly from the jib-masts 51 extend and are secured to a collar 55 at the top of the mast 17. Cable-attachment plates 56 are mounted on support-arms 57 attached to the mast 17 below the boom-arms 18; the cables 49 extend outwardly from the plates 56 to boom-arm brackets 58, while the cables 50 extend up from the plate 56 to collar 55.

The boom support-structure just described is merely an example of boom-sprinkler construction, and it is emphasized that the inventive features are concerned primarily with the water distribution outlets and their control and could be applied to sprinkler-booms supported in a different fashion.

The boom-arms 18 may comprise sections of conduit welded to the mast 17. Standard fittings may be employed as attaching unions for the boom accessories. Since the water, coming through the mast 17 at approximately 60 p.s.i., is used up at outlets along the boom-arms 18, the inner portions of the boom-arms 18 must accommodate a greater flow of water than the outer portions. Therefore, the conduit sections on the outer portion of the boom-arms 18 are of reduced diameter, and they may be connected together by standard reduction-couplers 59. Also, the upper portion 60 of the mast 17, above the boom-arms 18, need not be a conduit and may be blocked off from passage of water by a blind-flange connection 61.

At the outer ends of the boom-arms 18 are the fixed-nozzles 19 which provide the largest single outlets on the boom-arms 18 and have adjustable nozzle-orifices 62 to deliver water efficiently at approximately 50–60 p.s.i.

*The auxiliary jet-nozzle 20*

Figure 7:
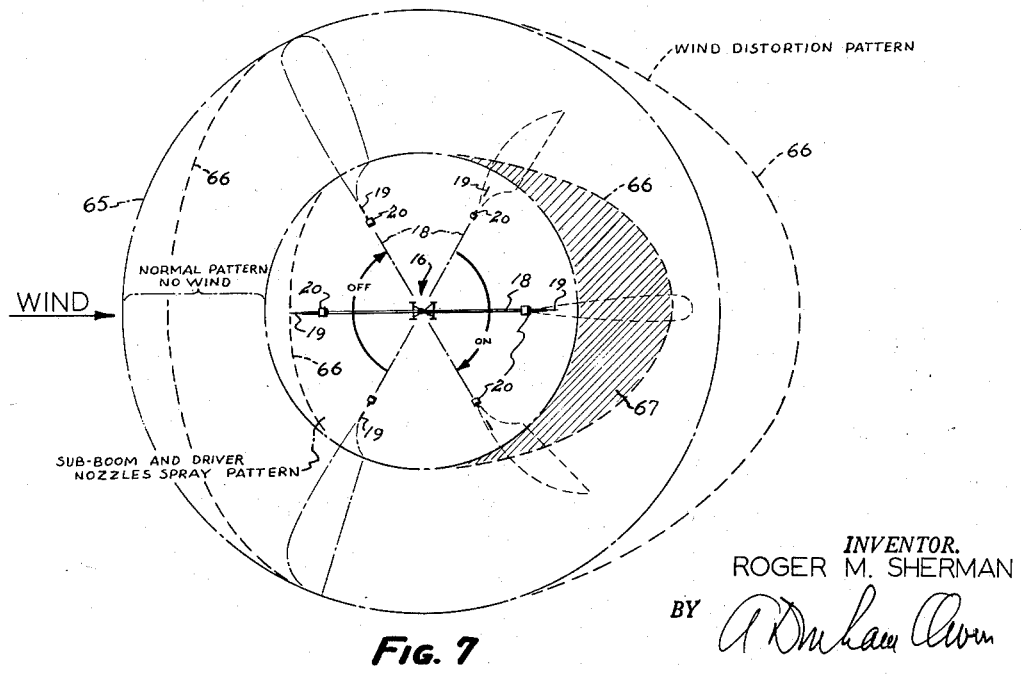
FIG. 7 is a schematic plan view of the boom sprinkler in FIG. 1, showing how wind affects the normal precipitation pattern by leaving an unwatered area and showing how the auxiliary nozzles of the present invention cover this area.

Heretofore, boom-sprinklers of the prior art utilized only fixed nozzles mounted on the boom-arms, which distributed water over a fairly large area beyond the ends of the booms. The area was quite predictable when there was no wind. A diagrammatic sketch in plan view, shown by FIG. 7, depicts a typical precipitation pattern 65 on a windless day. However, where it is necessary to operate the boom-sprinkler in areas of prevailing winds, the water from the main nozzles 19 will consistently overshoot on the downwind side of the boom-sprinkler and spread the water over a distorted precipitation pattern 66 which creates a completely neglected close-in area 67.

On the upwind side of the boom-sprinkler, the water from the fixed-nozzles 19 will tend to "blow back" and further distort the precipitation pattern 66. This "blow back," which is also illustrated diagrammatically in FIG. 15, causes over-watering on the upwind portion of the boom revolution and adds to the overall distortion problem. The unique boom-sprinkler system 16 of this invention includes novel auxiliary jet-nozzles 20 which, when mounted on the boom-arms 18, specifically overcome the aforementioned problem by supplying precipitation to the neglected downwind area 67.

Also, the auxiliary nozzles 20 produce an important secondary effect in that, when they are operated to release water during a portion of the boom revolution, the amount of water flowing through the main-nozzles is simultaneously reduced, which lessens the upwind over-watering and downwind distortion. To achieve the desired performance from the auxiliary-nozzles 20, they must be comparatively large and are generally capable of operating at the full available pressure in the boom 18, of from 50 to 70 p.s.i. Of course, with a larger nozzle more capacity is available but also higher pressure is required to get adequate break-up of the water stream. In FIGS. 8–10 I have shown a typical auxiliary-nozzle 20 having a nozzle-head 70 with an outlet-orifice 71 fixed in a position generally parallel to the boom-arm 18 and pointed in a direction which will provide coverage for the otherwise neglected area 67 shown in FIG. 7. The nozzle-head 70 is integrally connected to a plug-valve 72 which is, in turn, connected by a short length of conduit 73 attached to a standard conduit-coupler 74 (FIG. 10) in the boom-arm 18. The plug-valve 72 shown in FIGS. 8–10 has internal vane-members 75 attached to shaft 76, which are rotatable to vary the size of an opening 77 leading into the nozzle-head 70 and thus provide a variable flow through the outlet-orifice 71.

The shaft 76 extends outside the plug-valve 72 and is rigidly secured to a vane 78 by an arm 79. The arm 79 is positioned so that wind-force blowing against the vane 78 will rotate the shaft 76 and thereby move the internal vane-members 75 to regulate the flow of water through the auxiliary-nozzle 20. The wind-vane 78 may from any convenient durable material, preferably a thin, rigid sheet of aluminum.

Another form of plug-valve 72a has been illustrated in FIG. 11 wherein a rotatable core member 68 having a cylindrical orifice 69 is rotatably mounted within nozzle-body 70a and is attached by shaft 89 to arm 79a on which is mounted vane 78a. Movement of the vane 78a by a wind-force in the same manner as applied to the auxiliary-nozzle 20 of FIG. 8 rotates the core-member 68 to control the flow of water through orifice 69. In this modification, the vane-operated plug-valve 72a either turns the nozzle 20 on or off and no spring is provided for regulation. However, the valving of the water flow through simple rotation of the vane-controlled core 68 is sufficient to accomplish an adequate job of sprinkling the otherwise neglected area 67 shown in FIG. 7.

The plug-valve 72 can operate with the axis of the shaft 75 positioned either horizontally or vertically. With the shaft 75 horizontal, as shown in FIG. 10, the weight of the wind-vane 78 may be utilized to stabilize the valve 70 in either the opened or closed position. When the shaft 75 is vertical, there is little tendency for it to stay in any one position, and it will operate with a lighter wind than when the axis is horizontal.

The operation of the auxiliary-nozzle 20 may be explained with reference to FIG. 7. As the boom 18 starts its upwind swing, the wind forces the vane 78 to shut the plug-valve 72, and as the boom 18 swings downwind, the vane 78 (now receiving wind on the opposite side) opens the valve 72 to allow water to flow from the boom 18 through the auxiliary-nozzle 20 and spray water over the otherwise neglected area 67, shown in FIG. 7. The plug-valve 72 thus remains open during the downwind portion of the boom revolution and commences to close as the boom 18 starts its swing upwind.

The secondary advantage of the auxiliary-nozzle plug-valve 72 is realized when the auxiliary-nozzle 20 opens on the downwind portion of the boom-revolution, since the release of water through the auxiliary-nozzle 20 also reduces the pressure available to the main fixed-nozzles 19, thus cutting down on the main-nozzle flow on both the upwind and downwind boom-arms 18. This flow reduction compensates for the fact that the main-nozzles 19 already are covering too great an area on the downwind side and are over-watering on the upwind side, due to wind effect.

It is possible to control the amount of wind required to actuate the plug-valve 72 by placing a spring 80 between the wind-vane arm 79 and the plug-valve 72 or boom-arm 18. Using this control means, a plurality of auxiliary jet-nozzles 20 may be placed along the boom 18 and, by placing springs 80 of different strengths on each wind-vane 78, the auxiliary-nozzles 20 may be made to operate at various wind velocities to compensate for the neglected area 67 that normally would expand with increasing wind velocity.

*The pivotal driving-nozzles 21*

One of the disadvantages of conventional rotating boom-type sprinklers, as employed in the prior art, is that when operating in a wind the boom would be slowed down by wind-drag as the boom swung perpendicularly to the wind vector and sped-up when parallel to the wind vector. This may be explained briefly by the fact that drag on the boom is proportional to the square of the velocity of the wind on the boom. Thus, with a wind blowing on a rotating boom, the drag on the upwind boom-arm 18 is considerably increased and on the downwind boom the drag is decreased when the boom is perpendicular to the wind vector. These unbalanced drag-forces acting on both boom-arms in given wind conditions total more than the balanced drag-forces which occur in a windless condition, normally due to the mere rotation of the boom and when the boom swings parallel to the wind vector. Consequently, the variation in drag-forces on the boom-arms while they rotate to be alternately perpendicular and parallel to a wind vector causes similar variations in torque and speed of the boom during a given revolution.

This variation in the boom speed, due to wind velocity, results in further distortion of the precipitation pattern, since the nozzles operate for longer periods along slow portions of the circular path and for shorter periods along the portions of travel where the boom increases speed.

The present invention corrects this rotation problem of the boom 18 in high wind conditions by employing pivotable driving-nozzles 21 on the rotating boom-arms 18. The movable driving-nozzle 21, shown in detail in FIGS. 12 and 13 and comprising an L-shaped nozzle-body 81 with an outlet-orifice 82, will normally operate at approximately 10–20 p.s.i. but can, if desired, use full boom pressure of 50–70 p.s.i. Attached firmly to the nozzle-body 81 by clamps 83 is a vane 84. Like the vane 78, the vane 84 may be made from any rigid, durable material, such as aluminum, wood, or plastic, and may be fixed in alignment with the nozzle-body 81 or may be canted somewhat at a fixed angle. The vane 84 may also be located alongside or near the rear of the nozzle-body 81, if desired, as long as it is positioned to control the movement thereof.

The L-shaped nozzle-body 81 has a generally horizontal portion 85 that lies in a plane substantially parallel the boom-arm 18 and a vertical portion 86 whose lower end 87 is threaded to attach to a fitting 88 on the boom-arm 18. A collar 90 is held in place at the upper end of the vertical portion 86 by a set-screw 91 which permits angular adjustment. A similar collar 92 is attached to the lower end of the vertical portion 86 and held in place by set-screw 93. A coil-spring 94 is attached at one end to the collar 90 and at its other end to the collar 92. Thus, when the wind blows against the vane 78, the nozzle 21 may swing about the axis of the vertical conduit portion 86 against the force of the spring 94.

The swing of the driving-nozzle 21 may be limited by a stop-mechanism 75 attached snugly around the vertical conduit section 86 under the collar 92 and held by a screw 96. The stop-mechanism 75 has two similar projections 97 and 98, each with an adjustable screw 100, 101 which may be moved in and out to act as limit-stops. An arm 102, which may be an integral part of the nozzle-body 81, extends downward so as to move between the limit-stops 97 and 98 and thus restrict the nozzle travel.

In operation, the driving-nozzles 21 are moved relative to the rotating boom-arms 18 when wind-load on the vanes 84 changes. Their movement causes a change in torque that affects the angular velocity of the boom 18. In FIG. 14, the boom 18, equipped with the movable driving-nozzles 21 at either end, is shown schematically at various positions during a revolution. Describing the schematic diagram of FIG. 14 in terms of a clock-face pattern, the wind is shown blowing from twelve o'clock. As a result, when the boom 18 is in the nine o'clock position, the nozzles 21 lie at 90°. As the boom 18, rotating clockwise, moves from the nine o'clock position to approximately the eleven o'clock position, the wind forces the vane 84 to swivel the nozzle 21 counter-clockwise on the boom 18 until the arm 102 engages the limit-stop 100 shown in FIG. 13. In so doing, the direction of the reactive force from the nozzle 21 relative to the axis of rotation 103 of the boom 18 also is changed, which reduces the effective moment arm M, and thus the torque of driving-nozzle 21 on the boom 18.

The nozzle 21, with the wind forcing the vane 84 against the limit-stop 100, holds this relative position with the boom 18 as it passes through the twelve o'clock position. Normally, at twelve o'clock, the boom-arm 18 would have a greater velocity, since it is not affected by wind-drag at this point; but the swiveling of the nozzle 21 reduces the torque to compensate for an expected increase in speed. As the boom-arm 18 passes through the twelve o'clock position, the vane 84—having a natural tendency to align itself with the wind—gradually turns back the nozzle 21 so that, as the boom 18 sweeps through the three o'clock position, the nozzle 21 returns to the position where the arm 102 lies against the stop 101, exerting maximum torque at the portion of the boom-revolution where the wind generally tends to slow the boom 18 down. The wind blowing against the vane 84 holds the arm 102 against the limit-stop 81 in the maximum torque position, until the boom passes around through the nine o'clock position again. Thus it is seen that, by swiveling the nozzle 21 between limits to vary torque, the angular velocity of the boom 18 can be made nearly constant, even though operating in a prevailing wind. The limit-stops 100 and 101 may be adjusted to provide a variance in amount of nozzle-travel, to achieve the proper amount of compensating torque control.

As shown in FIG. 1, the booms 18 may each be provided with a plurality of driving-nozzles 21 and 21a, each with a spring 94 of different strength, so that the nozzles 21 and 21a are moved in response to wind velocities of varying intensity. For example, if three driving-nozzles similar to the nozzle 21 are placed along each boom-arm 18, the inner one can be adjusted to vary torque on the boom by swiveling at 8 m.p.h. of wind, the second one at 12–15 m.p.h., and a third one at anything over 15 miles per hour. In this manner, as the wind increases, extra thrust is available to maintain the even rotation of the boom 18. Similarly, the area of the vane 84 on different nozzles may be varied on a particular boom to provide a gradation in actuation-force on the nozzles 21. In addition, the vanes themselves may utilize means to afford variable control area. For example, the vanes may be constructed with extendable sections responsive to wind velocity.

*Sub-booms for close-in precipitation*

Another important feature of the full-coverage boom-sprinkler system 16 is the use of sub-booms 22, which are shown in FIG. 3. In prior-art boom-type sprinklers, the area directly under the rotating boom was sought to be covered by a series of jets mounted along the boom, using relatively high boom pressure and pointing in a direction approximately parallel with the ground level. The spray pattern thus produced was very susceptible to wind distortion, since the streams from the nozzles were released at a height where they could be affected by the wind. The present invention solves this problem by providing unique sub-booms which can be regulated to operate at reduced pressure and extend downward to spray water just above the crop level as the boom rotates, so that wind has no chance to affect the precipitation pattern.

The sub-boom 22 includes a generally vertical conduit 110, the upper end of which is attached at substantially a right-angle to the boom 18. A distribution pipe 111 is attached substantially perpendicularly to the lower end of the conduit 88, forming a T-section. The pipe 111 is equipped with distribution outlets 112 at various points along its length, to spray water in a desired pattern. With the present invention using the sub-booms 22 instead of attaching nozzles directly to the boom 18, as is done by the prior art, the sub-boom outlets 112 can be located close to the crop level and thus avoid wind effects. When located in close proximity to the crops, the force of the water streams must be reduced to avoid damage to the crops. Thus, the outlets 112 must provide a spray pattern but must also operate at reduced pressure to prevent "fogging" or too fine a break-up of the spray. To provide the proper amount of pressure at the sub-boom outlets 112, a valve 113 is employed which can be regulated for various conditions. An orifice could also be used to get a desired reduction in pressure. The conduit 110 shown in FIG. 1 may be cut to any suitable length so that the sub-boom 22 passes directly over the top of the crops and the spray pattern is not distorted by wind. The sub-booms 22 may be placed at any convenient spacing along the boom 18 in order to completely cover the area swept out under the boom by its rotation. Preferably, the sub-boom conduit 110 is of such size as to permit a nozzle-pressure of 8–10 p.s.i., which will give adequate spray from the outlets 112. The sub-boom conduits 110 at the outer ends of the main boom-arm 18 should be larger in diameter than the sub-booms closer to the mast 17, so that flow can be increased in order to provide the same amount of precipitation per unit area passed over by the main-boom 18 from its mast 17 to the outer edge of the boom pattern.

*Operation of the sprinkler system 16*

From the foregoing description, it is seen that the present invention provides a highly effective boom-sprinkler which overcomes the major problems tending to disrupt the efficiency of prior boom-type sprinklers. The sprinkler will operate under almost all wind conditions and, as shown in FIG. 15, it will provide a uniform, predictable pattern of precipitation within limits required by exacting irrigation standards. FIG. 15 diagrammatically shows how the boom-sprinkler system 16, with its versatile distribution outlets, covers completely a prescribed area with a uniform rate of precipitation.

In operation, the boom-sprinkler system 16 of the present invention, as shown in FIG. 15, receiving water under approximately 60 p.s.i. through the supply conduit 25 and up through the mast 17 to the boom-arms 18, supplies water to the fixed main-nozzles 19 at the ends of the boom-arms 18 to throw water over a wide area. The sub-booms 22 distribute water directly under the rotating-boom 18, at a height above the crops so short that the spray-pattern on the ground is unaffected by wind. The pivoted driver-nozzles 21, providing reaction forces on the boom-arms 18, create torque about the boom-mast 17 and, with their attached vanes 84, act to maintain a constant rotational velocity for the boom-arms 18 despite the prevailing wind conditions, as shown in FIG. 14. The constant rotational velocity of the boom 18 distributes water evenly over all sectors of the precipitation area, during a given revolution of the boom. The vane-actuated plug-valve 72 on the auxiliary-nozzles 20 mounted on the boom 18 releases additional water to supply precipitation to an area 67 which otherwise would be neglected when the boom 18 is operating in a wind, as also shown in FIG. 7.

All of the nozzle-outlets; the fixed-nozzle 19, the auxiliary-nozzles 20, the swivelable driver-nozzles 21, and sub-booms 22 attached to and distributing water from the boom-arms 18; cooperate to provide a sprinkler-system 16 which distributes moisture evenly over a prescribed area under varying wind conditions.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. In a water distribution system of the rotating-boom type adapted to provide substantially uniform precipitation over a wide area under varying wind conditions, and having an upright, hollow, water-conducting, rotatable mast on a frame, water-conducting boom-arms extending outwardly from said mast, and fixed outlets on the ends of said boom-arms, the combination therewith of: auxiliary variable outlet means attached to said boom-arms to provide intermittent precipitation in a predetermined area during a portion of each boom revolution said variable outlet means having valve means controlled by vane means in response to the environmental wind force against said vane means and the water distribution system; driving outlet means positioned on each boom-arm to rotate the mast at a substantially constant angular velocity under variable wind conditions; and sub-boom means attached to said boom-arms to supply precipitation to the area swept out by said boom-arms.

2. In a water distribution system of the rotating-boom type adapted to provide substantially uniform precipitation over a wide area under varying wind conditions, and having an upright, hollow, water-conducting, rotatable mast on a frame, water-conducting boom-arms extending outwardly from said mast, and fixed outlets on the ends of said boom-arms, the combination therewith of: auxiliary variable outlet means attached to said boom-arms to provide intermittent precipitation in a predetermined area during a portion of each boom revolution, said auxiliary variable outlet means having valve means controlled by means responsive to the environmental wind force against the water distribution system; driving outlet means comprising pivotal driving-nozzle means on each boom-arm, adapted to rotate the boom-arms at a substantially constant angular velocity under all wind conditions, said driving-nozzle means comprising a nozzle-body, a swivel-connection between said nozzle-body and said boom-arms, a spring attached to said nozzle-body and said boom-arms normally urging said nozzle-body generally perpendicular to said boom-arms, driving-nozzle vane means fixedly attached to said nozzle-body and means to limit the travel of said nozzle-body within predetermined angular limits relative to said boom-arms; and sub-boom means attached to said boom-arms to supply precipitation to the area swept out by said boom-arms.

3. The device as described in claim 2, wherein said auxiliary variable-outlet means mounted on each boom-arm comprise a nozzle-body, valve means connecting said nozzle-body and said boom and controlling the flow of water therethrough, spring-loaded vane means attached to said valve means and adapted to open said valve in response to a predetermined wind-force to provide intermittent precipitation over a desired area during a portion of each boom revolution.

4. In a water distribution system of the rotating-boom type, adapted to provide substantially uniform precipitation over a wide area under varying wind conditions, having an upright, hollow, rotatable mast mounted on a frame, boom-arms extending outwardly from said mast, and fixed-outlets on the ends of said boom-arms, the combination therewith of sub-boom means attached to said boom-arms to supply precipitation to an area passed over by said boom, driving-outlet means positioned on each boom-arm to rotate the boom-arms at substantially constant angular velocity under variable wind conditions and auxiliary variable-outlet means mounted on each boom-arm, comprising a nozzle-body, valve means connected to said nozzle-body and said boom and controlling the flow of water therethrough, spring-loaded vane means attached to said valve means and adapted to open said valve in response to a predetermined wind-force, to provide intermittent precipitation over a desired area during a portion of each boom-revolution.

5. In a water distribution system of the rotating-boom type adapted to provide substantially uniform precipitation over a wide area under varying wind conditions, having an upright hollow rotatable mast mounted on a frame, boom-arms extending outwardly from said mast and fixed-outlets on the ends of said boom-arms, the combination therewith of: sub-boom means attached to said boom-arms to supply precipitation to the area passed over by said boom; auxiliary variable-outlet means attached to each boom-arm to provide intermittent precipitation in a predetermined area during a portion of each boom revolution and pivotal driving-nozzle means on each boom-arm adapted to rotate the boom-arm at a substantially constant angular velocity under all wind conditions, comprising a nozzle-body, a swivel-connection between said nozzle-body and said boom-arm, a spring attached to said nozzle-body and said boom-arm normally urging said nozzle-body generally perpendicular to said boom-arm, vane means fixedly attached to said nozzle-body and means to limit the travel of said nozzle-body within predetermined angular limits relative to said boom-arms.

6. The device as described in claim 5, wherein each boom-arm is equipped with a plurality of pivotal driving-nozzle means having connecting springs of variable strength whereby each driving-nozzle responds to a different wind velocity to pivot relative to the boom-arm.

7. In a water distribution system of the rotating-boom type adapted to provide substantially uniform precipitation over a wide area under varying wind conditions, the combination comprising: an upright, hollow mast supported by a frame and free to rotate; a plurality of boom-arms attached to and extending outwardly therefrom, the source of water under pressure supplied to said hollow mast at its lower end and adapted to pass through said mast into said boom-arms; auxiliary variable-outlet means attached to each boom-arm to provide intermittent precipitation in a predetermined area during a portion of each boom-revolution; and pivotal driving-nozzle means on each boom-arm adapted to rotate the boom-arms at substantially constant angular velocity under all wind conditions, comprising a nozzle-body, a swivel-connection between said nozzle-body and said boom-arm, a spring attached to said nozzle-body and said boom-arm normally urging said nozzle-body generally perpendicular to said boom-arm, vane means fixedly attached to said nozzle-body, and means to limit the travel of said nozzle-body within predetermined angular limits relative to said boom-arm.

8. In a water distribution system of the rotating-boom type adapted to provide substantially uniform precipitation over a wide area under varying wind conditions, the combination comprising: an upright, hollow mast supported by a frame and free to rotate; a plurality of boom-arms attached to and extending outwardly therefrom; a source of water under pressure supplied to said hollow mast at its lower end and adapted to pass through said mast and said boom-arms, said boom-arms having fixed-outlet means attached to the ends thereof; auxiliary variable-outlet means mounted on each boom-arm, comprising a nozzle-body, valve means connecting said nozzle-body and said boom-arms and controlling the flow of water therethrough; spring-loaded vane means attached to said valve means and adapted to open said valve in response to a predetermined wind-force to provide intermittent precipitation over a desired area during a portion of each boom-revolution; and pivotal driving-nozzle means on each boom-arm adapted to rotate the boom-arms at a substantially constant angular velocity under all wind conditions, comprising a nozzle-body, a swivel-connection between said nozzle-body and said boom-arm, a spring attached to said nozzle-body and said boom-arm normally urging said nozzle-body generally perpendicular to said boom-arm, vane means fixedly attached to said nozzle-body, and means to limit the travel of said nozzle-body within predetermined angular limits relative to said boom-arms.

9. In a water distribution system of the rotating-boom type adapted to provide substantially uniform precipitation over a wide area under varying wind conditions, having an upright, hollow, rotatable mast mounted on a frame, boom-arms extending outwardly from said mast, and fixed-outlets on the ends of said boom-arms, the combination therewith of pivotal driving-outlet means positioned on each boom-arm and being movable in response to said varying wind conditions to automatically adjust the reactive forces of said driving outlet means on said boom arms to rotate the mast at a substantially constant angular velocity.

10. The device as described in claim 9, wherein said pivotal driving outlet means comprises: a nozzle-body; a swivel-connection between said nozzle-body and said boom-arm; a spring attached to said nozzle-body and said boom-arm, normally urging said nozzle-body generally perpendicular to said boom-arm; vane means fixedly attached to said nozzle-body; and means to limit the travel of said nozzle-body within predetermined angular limits relative to said boom-arm.

11. In a water distribution system of the rotating-boom type adapted to provide substantially uniform precipitation over a wide area under varying wind conditions, the combination comprising: an upright, hollow mast supported by a frame and free to rotate; a plurality of boom-arms attached to and extending outwardly therefrom; a source of water under pressure supplied to said hollow mast at its lower end and adapted to pass through said mast into said boom-arms, said boom-arms having fixed-outlet means attached to the ends thereof; a plurality of auxiliary variable-outlet means attached to each boom-arm, each of said auxiliary variable-outlet means comprising a nozzle-body having valve means controlling the flow of water therethrough, vane means attached to said valve means adapted to open and close said valve in response to a predetermined wind-force, and spring means attached to said vane means and said valve means on each of said outlet means to provide actuation of said valve means on each auxiliary outlet when the wind velocity reaches a predetermined volocity to provide intermittent precipitation over a desired area during a portion of each boom-revolution.

12. A water distribution system comprising: a boom; a means to support said boom; a source of water under pressure supplied to said boom; outlet means on said boom connected to said water source, said outlet means being movable within angular limits relative to said boom; means to move said outlet means in response to prevailing environmental wind forces acting on said water distribution system, causing said boom to rotate at a constant angular velocity to thus distribute water at a uniform rate over a described area covered by said system during each boom revolution.

13. A rotary water distribution system for use in windy areas, comprising: a boom rotatable on a mast; means to supply water under pressure to said boom and means to rotate said boom; nozzle means attached to said boom; valve means on said nozzle means; and vane means connected to said valve means and adapted to actuate said valve means during a portion of each boom revolution to vary the flow of water from said nozzle in response to a prevailing wind blowing on said water distribution system; whereby a downwind area adjacent the distribution system receives an additional amount of water to compensate for the distortion of the precipitation pattern caused by the wind.

14. In a water distribution system of the rotating-boom type adapted to provide substantially uniform precipitation over a wide area under varying wind conditions, the combination comprising: an upright, hollow mast supported by a frame and free to rotate; a plurality of boom-arms attached to and extending outwardly therefrom; a source of water under pressure supplied to said hollow mast at its lower end and adapted to pass through said mast into said boom-arms, said boom-arms having fixed-outlet means attached to the ends thereof; auxiliary variable-outlet means attached to each boom-arm comprising a nozzle-body mounted on each boom-arm, valve means connecting said nozzle-body and said boom arm and controlling the flow of water therethrough, spring-loaded vane means attached to said valve means and adapted to open said valve in response to a predetermined wind-force to provide intermittent precipitation over a desired area during a portion of each boom-revolution; and driving-outlet means positioned on each boom-arm to rotate the mast at a substantially constant angular velocity under variable wind conditions.

15. In a water distribution system of the rotating-boom type adapted to provide substantially uniform precipitation over a wide area under varying wind conditions, having an upright, hollow, rotatable mast mounted on a frame, boom-arms extending outwardly from said mast and fixed-outlets on the ends of said boom-arms, the combination therewith of: auxiliary variable-outlet means attached to each boom-arm comprising a nozzle-body mounted on each boom arm, having valve means connecting said nozzle-body and said boom-arm and controlling the flow of water therethrough; spring-loaded vane means attached to said valve means and adapted to open said valve means in response to a predetermined wind-force to provide intermittent precipitation over a desired area during a portion of each boom-revolution.

References Cited in the file of this patent

UNITED STATES PATENTS

| | | |
|---|---|---|
| 904,324 | Hartley | Nov. 17, 1908 |
| 1,272,070 | Macnicol | July 9, 1918 |
| 1,299,380 | Plumer | Apr. 1, 1919 |
| 1,632,353 | Todd | June 14, 1927 |
| 1,977,882 | Lassen | Oct. 23, 1934 |